United States Patent [19]
Luchner et al.

[11] Patent Number: 5,882,438
[45] Date of Patent: Mar. 16, 1999

[54] METHOD FOR THE FORMATION OF A FRANGIBLE ZONE FOR THE FRACTURE SEPARATION OF A MACHINE PART, IN PARTICULAR, A CONNECTING ROD FOR INTERNAL COMBUSTION ENGINES

[75] Inventors: Clemens Luchner, Baldham; Helmut Poellath, Eichenau, both of Germany; Helmut Hochsteiner, Haidershofen, Austria

[73] Assignee: Bayerische Motoren Werke Aktiengesellschaft, Munich, Germany

[21] Appl. No.: 605,205

[22] PCT Filed: Apr. 30, 1996

[86] PCT No.: PCT/EP96/01797

§ 371 Date: Aug. 29, 1996

§ 102(e) Date: Aug. 29, 1996

[87] PCT Pub. No.: WO97/22430

PCT Pub. Date: Jun. 26, 1997

[30] Foreign Application Priority Data

Dec. 19, 1995 [DE] Germany ............... 195 47 389

[51] Int. Cl.[6] .................................................. B23K 26/00
[52] U.S. Cl. .................. 148/222; 148/224; 148/565; 219/121.66; 219/121.68; 219/121.69; 225/2
[58] Field of Search ................. 148/222, 224, 148/525, 565; 219/121.65, 121.66, 121.68, 121.69, 121.7, 121.71; 225/2

[56] References Cited

U.S. PATENT DOCUMENTS

| | | | |
|---|---|---|---|
| 3,818,577 | 6/1974 | Bailey et al. | 29/413 |
| 4,401,477 | 8/1983 | Clauer et al. | 148/565 |
| 4,533,400 | 8/1985 | Benedict | 148/565 |
| 4,708,752 | 11/1987 | Kar | 148/525 |
| 4,754,906 | 7/1988 | Brovold | 225/2 |
| 4,970,783 | 11/1990 | Olaniran et al. | 29/413 |
| 5,208,979 | 5/1993 | Schmidt | 225/2 |
| 5,413,641 | 5/1995 | Coulon | 148/224 |
| 5,626,777 | 5/1997 | Hugl et al. | 225/2 |

FOREIGN PATENT DOCUMENTS

| | | | |
|---|---|---|---|
| 34 25 829 | 1/1985 | Germany . | |
| 220340 | 3/1985 | Germany | 148/224 |
| 38 06 236 | 8/1989 | Germany . | |
| 195 34 360.3 | 5/1995 | Germany . | |
| 295 19 126 | 5/1996 | Germany . | |
| 44 42 062 | 5/1996 | Germany . | |
| 56-47521 | 4/1981 | Japan | 148/565 |
| 1-152220 | 6/1989 | Japan | 148/565 |
| 2-294423 | 12/1990 | Japan | 219/121.66 |

OTHER PUBLICATIONS

*Mechanical Engineering* (Apr. 1990) entitled "Detroit Looks to Lasers", pp. 38–45.

*Primary Examiner*—George Wyszomierski
*Attorney, Agent, or Firm*—Evenson, McKeown, Edwards & Lenahan, P.L.L.C.

[57] ABSTRACT

For a method for the formation of a frangible zone for fracture separation of a part, namely a connecting rod for internal combustion engines, by which method, in a fracture plane for the intended triggered break-away, a frangible zone is formed along a side of the plane, through which, ordered depressions with ribs are developed from the surface, there is proposed that in the case of a part comprised of ductile metal, the ribs are at least sectionally embrittled, i.e. penetratingly hardened, for intended formation of initial starting cracks.

27 Claims, 2 Drawing Sheets

METHOD FOR THE FORMATION OF A FRANGIBLE ZONE FOR THE FRACTURE SEPARATION OF A MACHINE PART, IN PARTICULAR, A CONNECTING ROD FOR INTERNAL COMBUSTION ENGINES

BACKGROUND AND SUMMARY OF THE INVENTION

The invention relates to a method for the formation of a frangible zone for fracture separation of a part, in particular, connecting rods for internal combustion machines. A frangible zone is produced for the intended triggered fracture having ribs and depressions which are separated, one from the other, and arranged at least partially in the surface of the part along one side of the fracture separation plane.

A method for the formation of stress riser grooves in the fracture plane of a separable part is known through the U.S. Pat. No. 5,208,979. To produce stress riser grooves that are essentially knife-sharp at their bases, grooves having a V-shaped cross section are formed in the part's surface by means of a laser at appropriate locations in or on the part. The depth of the groove is greater than its width. As is known, the hairline cracks that initially form at the beginning of a fracturing process at the bottom of a stress riser groove are of considerable importance for the quality of the fracturing surfaces, said cracks not being deliberately predictable because of the inhomogeneous structure of the part over the length of the stress riser grooves.

This disadvantage should be overcome in accordance with German patent document DE-U 295 19 126 in the case of a formed workpiece, especially a connecting rod with an opening (a bore for a bearing), having diametrically opposed frangible zones. Instead of every continuous, straight line V-groove being produced by a laser in accord with U.S. Pat. No. 5,208,979, a plurality of indentations laid linearly next to each other serve as groove sections. The laser employed for the boring of the groove sections into finger shaped, or cylindrical blind holes, is so far reduced in load capacity by this procedure, that the transformation associated with heat input (Martinsite) in the adjacent areas of the groove sections is exceptionally small. It is a stated goal, to avoid in all cases, a continuous transformation occurring in the ribs which remain between the groove sections, in order that these frangible zones can be machined away following a fracture.

Further, the production of a series of blind holes, in a naturally hardened work piece next to one another by means of a laser for the purpose of engendering a controlled fracture, is also known, as this is described in the American magazine "Mechanical Engineering" in the April issue of 1990 in the article "Detroit looks to lasers" on page 41 in the left column.

The goal of the invention is to form the intended frangible zones in a fracturing plane for the predicted production of a crack, in a part made of ductile metal and divisible by fracturing in such a manner that starting cracks are achieved that are deliberately distributed over the length of the respective frangible zone.

The present invention achieves this goal by a method for the formation of a frangible zone for fracture separation of a part, in particular, connecting rods for internal combustion machines. A frangible zone is produced for the intended triggered fracture having ribs and depressions which are separated, one from the other, and arranged at least partially in the surface of the part along one side of the fracture separation plane. In the part, such as a rod, made of ductile metal, the ribs, at least in their free end sections near to the surface of the part, are penetratively embrittled for making an initial starting crack for triggering the break. This is done by performing a transformation across their cross sections. In the case of a part of ductile metal, the ribs, at least in their free end segments near to the surface of the part, become penetratably embrittled by a material transformation over their cross section, thus making the initial cracking for the triggering of the fracture.

Along with the frangible zones produced in accordance with the invention, contrary to a conventional, continuous groove parting line, or contrary to groove sections of softened material arranged in rows, there arises in an advantageous manner a number of transversely embrittled ribs defining short line segments, the length of which in total is substantially shorter, as opposed to the continuous groove separating line or a plurality of groove portions. By means of this situation, the fracturing severance strength, apportioned over a small cross section in the embrittled break-susceptible ribs, acts over the frangible zone to trigger the initiation of cracking. With the choice of the rib cross section in combination with the respective embrittlement process, the simultaneous triggering of starting cracks over the entire, invention oriented, frangible zone is achieved in an advantageous manner. Thereby, a point to point starting crack is avoided. Starting cracks per se, in sinter forged parts, among others, are made known by the German patent document DE-C 38 06 236. In the formulation of the invention, this advantage is thereby enhanced, in that the depressions in the respective base between the ribs, at least in the area of the fracture plane, are additionally embrittled.

Out of this arises the advantage that in the respectively weakest cross section of the rib, self elongating starting cracks combine with each other in reaching the respective base between the depressions to form a continuing fracture front as they progress through the rib.

Without expensive measures, the fracturing points in accordance with the invention in the case of a part made of a ferrous material with a carbon content of C≈0.55 to 0.85% can be made, since the embrittlement of the ribs and/or the depressions are achievable by temperature dependent transformation. Especially advantageous is a hardening with self quenching which serves as a means of engendering transformation.

This measure is especially advantageously carried out, in that the depressions are created in the course of the procedure in accordance with the invention, that is, on a known basis of the fusing of the material of the part through radiant energy. The radiant energy is so applied by a laser, and the fused material is ejected or burned by means of a jet of air or oxygen. As a result, at least in the free end segments of the ribs, close to the surface of the part, the initial starting cracks are produced in embrittled transformed zones which overlap themselves at an acute angle. For the avoidance of subsequent finishing work in the area of the frangible zone, the ribs between neighboring depressions are disposed deeper, or deepened in relation to the surface of the part and, advantageously, the air or oxygen jet additionally serves this end.

The overlapped, embrittled zones produced by the procedure in accordance with the invention, are created in an especially advantageous and simple manner. The depressions are formed in a conical shape by a laser apparatus with a beam energy divided over the cross section of the pulsed laser beam according to the Gaussian distribution curve.

Through this clever application of the laser for the formation of the depressions, the goal is reached that a generally glass hard coating on all sides of the depressions formed through self quenching also permeates the ribs in the smallest cross sections. What is further achieved thereby, is a formation which is fracture sensitive and reaches to the very base of the frangible zone. This formation, depending upon the hardening process, can immediately exhibit hardening cracks as starting cracks.

The depressions formed advantageously by a pulsed laser show in respective optional cross section in the direction of their arrangement beside one another on the surface of the part a breadth of 0.4 mm and a depth between about 0.4 to 0.9 mm. The advantage of these relatively narrow frangible zones, is that they can remain, depending on the finishing operation of a bearing boring, with additional installation of bearing bushings or roller bearings to the part. Support for this is provided according to a further feature of the procedure in accordance with the invention, in that the embrittled rib tips produced from the top cut-off portions of neighboring, conically formed depressions are permitted to remain unchanged in their respective intervals deepened in relation to the surface of the part.

For carrying out the procedure in accordance with the invention, in further embodiments, an apparatus of advantageously simple construction is proposed, in which the laser devices are employed in an opening (bearing bore) of a part with interpenetrating, crossing laser beams in simultaneous, diametrically opposed frangible zones, whereby for the protection of the laser optical system, the part in a treatment position relative to the fixed laser equipment is moved forward for sequential formation of the depressions which are arranged-in an adjacently spaced manner.

Within the framework of the invention there is also known another type of ribs and depressions, which are annealed by means of an electron beam to achieve an increased fracturing sensitivity as is taught by U.S. Pat. No. 3,818,577.

Further, embrittlement is offered by means of thermal processes, mechanical working, and/or by means of cast ribs, and/or depressions by means of the occlusion of a gas in the metal of the respective part, as this is especially made known in the U.S. Pat. No. 4,970,783 which describes hydrogen embrittlement.

In an embodiment of a part having diametrically opposed frangible zones in a bearing boring, the procedure in accordance with the invention finds a preferential application in that, first the frangible zones are installed prior to the final finishing operation of the respective bearing boring of a formed connecting rod or machine bearing part, and second, the respective bearing cap between cap screws is so flexibly made that, with a broach chosen 0.05 to 0.15 mm smaller in diameter relative to the premachined bearing boring, an elastic deformation ensues that serves to create starting cracks in the ribs and/or the depressions. The advantage of this measure is that high tension stress is provided at the start of the fracture loading in the embrittled ribs for the triggering of starting cracks in which high quality break surfaces are of importance.

Other objects, advantages and novel features of the present invention will become apparent from the following detailed description of the invention when considered in conjunction with the accompanying drawings.

DETAILED DESCRIPTION OF THE DRAWINGS

Figure 1:
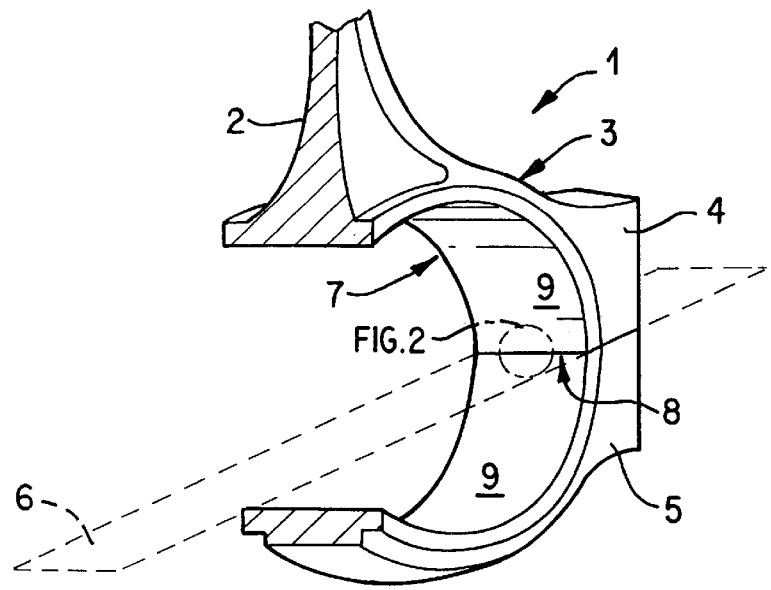
FIG. 1 shows in perspective view, a frangible zone in the bearing opening end of a (hereafter, "bearing end") connecting rod for a reciprocating piston machine.

A connecting rod 1 for a (not shown) reciprocating piston engine is shown in a partially sectioned view in FIG. 1. The connecting rod 1 is made of a steel having a carbon content of C≈0.55 to 0.85%. The connecting rod 1 includes on its shaft 2 a crankshaft bearing end 3 which is divided in two forming a bearing cap 5.

The dividing into two of the bearing end 3 is effected by fracture separation, for which purpose in a fracture plane 6 for a planned triggering of cracking in the bearing boring 7, diametrically opposed frangible zones 8 (only one shown) are provided in accordance with the invention.

The predicted originating point of the formation of each fracture zone 8 for an intended break release, is that each fracture zone 8, extending from the surface 9 of the part is arranged along a side of the fracture plane 6 and brought into being by the depressions 11 which are separated from one another by ribs 10. For the production of an initial starting crack with a quality fracture separation, the ribs 10, in accordance with the invention, at least in their free, near to the part surface truncated ends are penetratingly embrittled through their (small) cross section by means of transformation (Martensite). This embrittlement can be achieved through known annealing methods or through hydrogen or nitrogen embrittlement.

Preferentially used, at least in the case of area-wise annealing of the ribs 10 and/or the depressions 11, are such procedures with self quenching by heat removal into the surrounding part. Possibilities in this respect include depressions 11 with interposed ribs 10 produced by mechanical machining and/or by casting, or further the application of a known electron beam process. In accordance with the invention, the ribs 10 which are generally embrittled, at least in segments, are particularly sensitive to cracking. This is an advantageous property to use for the formation of hairline starter cracks. These offer upon break-away a reduced expenditure of energy, but nevertheless, yield a high quality of the fracture surface upon separation.

Figure 2:
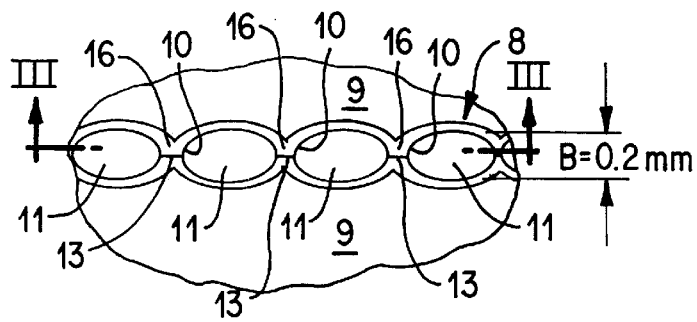
FIG. 2 is an enlarged partial view of the frangible zone of FIG. 1.
Figure 3:
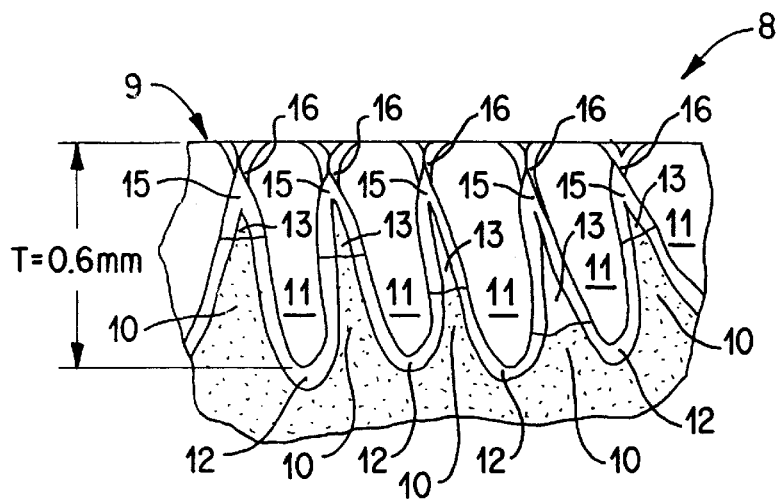
FIG. 3 shows the frangible zone of FIG. 2 in a profiled section view, enlarged.

Progressing from the known measures, according to which the depressions 11 were produced, by means of fusing/evaporation of the part material through radiant energy and the internal encasements the depressions 11 exhibit through the fusion produced transformation 12, there are favorable prerequisites achieved for hairline starting cracks in a steel connecting rod 1 with an inhomogeneous internal structure in accordance with a further procedure of the invention. The radiant energy evoked by a laser 14, 14' (FIG. 4) is so applied and the fused material blown out or burned out by an air or oxygen jet, that at least in the free ends of the ribs 10, which ends are near the surface of the part, self overlapping embrittled zones 15 are produced under a sharp peak angle of inner transformation 12 for the triggering of the initial starting cracks. In this, the air or oxygen jet additionally serves to make a deepened formation of the rib 10 relative to the part surface 9. The resulting self quenching connected with the blowing away of the fused material creates in the depressions 11 (See FIGS. 2, 3) a complete inner hardened layer 12, which penetrates the ribs 10 at least in the smallest cross sections in the area of their apexes 16, and by so doing at least these cross sections are penetratingly embrittled.

The self overlapping zones 15 of transformation 12 are particularly advantageously and simply achieved thereby, in that the depressions 11 are formed conically via a laser apparatus 14, 14' with a Gaussian distribution curve of emitted energy over the cross section of the pulsed laser beam 17, 17'.

A pulsed, solid state laser preferentially finds use in the formation of the conical shaped depressions 11 of the frangible zone 8, where there is produced, in connection with the smallest dimensioning of the depressions 11 of respectively a breadth B≈0.2 mm and a depth T≈0.6 mm, a type of small, locally bounded heat influx into the part (connecting rod 1) with a controlled developed hardened layer 12, to the end that the part, i.e., connecting rod 1, can be preliminarily made oversized for the later finishing machining operation of the bearing boring. In this manner, in accordance with the invention, assistance is offered in that, from the top cut-offs of neighboring cone shaped depressions 11, embrittled rib apexes 16 produced in contrast to the surface of the part, are not disturbed in their deepened intervals. With the rib apexes 16 reaching on to or near the part surface 9, the further advantage arises, that the particularly high rib apexes, because of their penetrative embrittlement are especially notch sensitive and thus upon applying a breaking stress break first and sequentially trigger the lower rib apexes 16 to form cracks.

On the grounds of the above described small breadth or width of about 0.2 mm at each frangible zone 8 circumferential array in the bearing boring 7, these zones can remain in place upon the installation of a roller bearing or of a bearing bushing, whereupon a machining cut for the removal of the respective frangible zones 8 is advantageously omitted.

Note is to be taken that the basis of the invention is not to see a high number of depressions 11 for each frangible zone 8, but to see in each frangible zone 8 a sufficient number of annealed, i.e. at least area-wise embrittled, ribs 10 as starting crack generators.

The number of the ribs 10 per frangible zone 8 defines itself by means of the number of sectionally longitudinally placed depressions 11. In contrast to a conventionally continuous stress riser groove (see U.S. Pat. No. 5,208,979) or a plurality of notch segments (see German patent document DE-U 295 19 126), there arises in opposition to these a number of shorter, cross-sectionally weak, embrittled ribs forming a line segment, the total length of which is substantially less than the above named stress riser grooves and notch segments, and further, said ribs are more fracture prone, so that the introduced fracturing power divides itself among fracture sensitive, embrittled ribs, with the advantage of the intended triggering of many starting cracks.

Further, and on the grounds of the preferred laser formed depressions 11, with a complete lining of a hardened layer 12, the starting cracks 13 begin in the base of the respective depressions 11, so that at the start of the fracture separation over the entire length of the frangible zone 8, divided starting cracks come into play, which progress through the ribs 10 to the respective base between the depressions 11 in order to unite themselves into a common breaking front in the ongoing process of the fracturing. In an advantageous manner, with many starting cracks 13 extending over the entire length of the frangible zone 8, a specified fracture separation is achieved in every cross section of the part with a high quality fracture surface.

Figure 4:
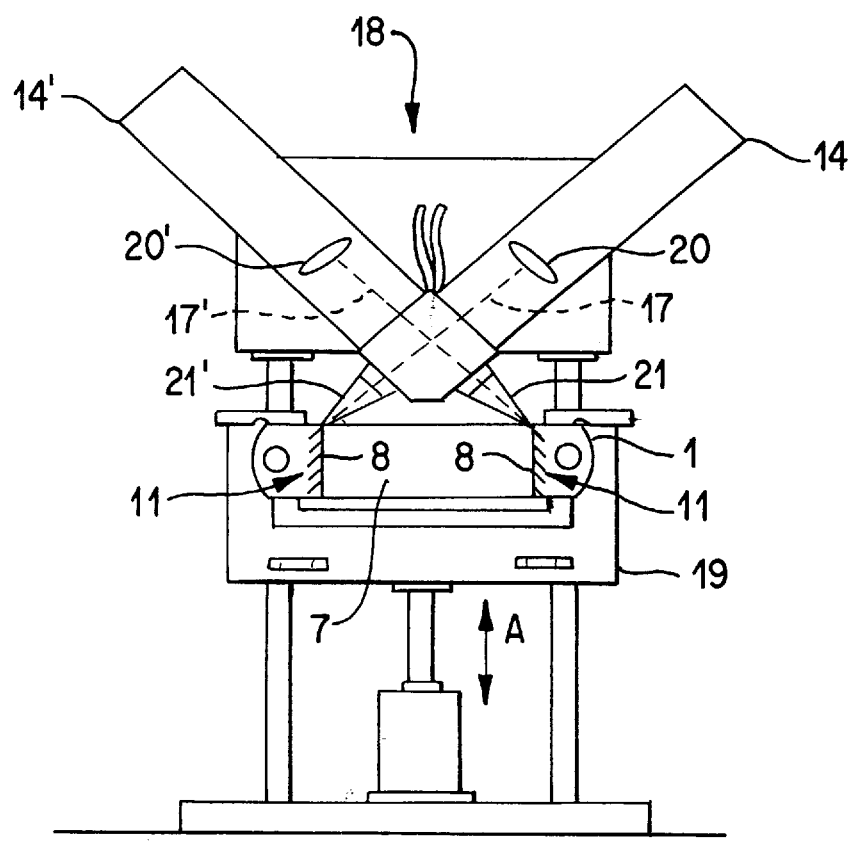
FIG. 4 shows a machining apparatus for a connecting rod with a fixed laser arrangement, wherein the frangible zones in the connecting rod are enlarged in longitudinal cross section.

FIG. 4 shows a not-to-scale presentation of an apparatus 18 for the execution of a preferred procedure in accordance with the invention. This apparatus is for the simultaneous completion of both frangible zones 8 in the bearing end 3 of the connecting rod 1, and consists of two laser units 14, 14', with preferably penetrating laser beams 17 and 17' which cross themselves. Further, the apparatus 18 is equipped with a mounting 19 for the positioning of the connecting rod 1. For the protection of the sensitive laser optical system 20, 20', the laser devices 14, 14' are fixed in the apparatus 18 and the mounting 19 relative to the laser units 14, 14' while allowing for the attainment of a preset, motor driven, adjustable advance movement of the part in the direction of the arrow A.

FIG. 4 shows further that the laser beams 17, 17' emerge from the apertures of jets 21, 21', which also serve for the feed of air or oxygen for the blowing out of the fused material from the respective depressions 11.

Instead of two laser units, it is also possible to provide a laser apparatus with only one laser unit using a beam splitter. Further, the depressions can be of a desired cross section, for which circumstance, laser beams with a corresponding beam cross section (that is, right angled cross section) can be installed.

As further advantages, the described arrangement yields a higher production speed with a still more exact placement of the frangible zone 8 as well as a simplified mounting 19 through the abolishment of a workpiece readjustment. Also a laser oscillation becomes superfluous with the proposed apparatus 18. As trials in this matter have shown, the V-shaped arranged depressions 11 in the frangible zones 8 diametrically opposed to one another surprisingly provide a further reduction of the break-away separating power and along with that, a lessening of part deformation.

With the frangible zones 8 constructed in accordance with the invention with at least, area wise, glass hard, embrittled ribs 10, there advantageously arises, by their usual, non V-shape contrasted against the conventional stress riser grooves, a substantial reduction of the separating fracture force, amounting to at least 50%. This proves to be of use in the manufacture of a steel connecting rod 1 with a V-shaped rib arrangement (see FIG. 4), in that part machining continues to the final finishing of the bearing bore 7, inclusive at least of a retaining groove for bearing caps. Additionally, the bearing cover 5 between the cap screws 4 can be flexibly installed in such a way, that by choosing a broach with a diameter 0.05 to 0.15 mm smaller than that of the premachined bearing 7, an elastic deformation is caused which serves for the production of starting cracks 13 in the ribs 10 and in the depressions 11.

The invention achieves a weight reduction in the steel connecting rod for reciprocating piston engines as well as an advantageous method for manufacture of the same.

Further, the invention is of advantageous use where a central, radially directed fracturing separation force is introduced in a bearing bore, as this is taught as the object of German patent document P 44 42 062.

Although the invention has been described and illustrated in detail, it is to be clearly understood that the same is by way of illustration and example, and is not to be taken by way of limitation. The spirit and scope of the present invention are to be limited only by the terms of the appended claims.

There is claimed:

1. A method for forming a frangible zone for fracture separation of a ductile metal part, said method comprising the steps of:

forming a plurality of depressions extending into the ductile metal part from a surface thereof such that ribs are defined between adjacent ones of said depressions, said depressions and said ribs defining a fracture separation plane, each of said ribs having an apex located proximate said surface of the ductile metal part; and penetratively embrittling at least a portion of each of said ribs to define an embrittled zone which is more brittle than a remaining non-embrittled portion of the ductile metal part which remains ductile.

2. A method according to claim 1, wherein said penetratively embrittling step promotes formation of starting cracks at said embrittled zone upon application of a separating force for the fracture separation of the part.

3. A method according to claim 1, wherein in said penetratively embrittling step, said ribs are embrittled over an entire length thereof.

4. A method according to claim 3, wherein in said penetratively embrittling step said embrittled zone extends into only a portion of a depth of the ribs, such that an interior portion of the ribs comprises said non-embrittled portion.

5. A method according to claim 1, wherein in said penetratively embrittling step said embrittled zone extends into only a portion of a depth of the ribs, such that an interior portion of the ribs comprises said non-embrittled portion.

6. A method according to claim 1, wherein said embrittled zone comprises an entirety of a cross-section of said ribs proximate said apex.

7. A method according to claim 1, wherein said depressions are generally conical.

8. A method according to claim 1, wherein said forming step comprises forming said depressions by applying radiant energy which fuses material of the part.

9. A method according to claim 8, wherein said radiant energy is a laser beam.

10. A method according to claim 9, wherein said laser beam is pulsed such that the radiant energy is apportioned in a Gaussian distribution curve over a cross-section of the laser beam.

11. A method according to claim 8, wherein said penetratively embrittling step comprises blowing out or burning said fused material with an air or oxygen jet.

12. A method according to claim 1, wherein said penetratively embrittling step is performed by annealing.

13. A method according to claim 1, wherein said penetratively embrittling step is performed by an occlusion of a gas in the depressions defining the ribs.

14. A method according to claim 13, wherein said gas is one of hydrogen and nitrogen.

15. A method according to claim 1, wherein said depressions have a cross-sectional width of approximately 0.4 mm and a depth between approximately 0.4 mm and approximately 0.9 mm.

16. A method according to claim 1, wherein said ductile metal part is made of a ferrous material having a carbon content of $C \approx 0.5$ to $0.85\%$.

17. A method according to claim 16, wherein said penetratively embrittling step comprises transformation of said ferrous material into martensite.

18. A method according to claim 1, wherein said ductile metal part is selected from the group consisting of a connecting rod and an engine bearing.

19. A method for forming a frangible zone for fracture separation of a ductile metal part, said method comprising the steps of:

forming a plurality of depressions extending into the ductile metal part from a surface thereof such that ribs are defined between adjacent ones of said depressions, said depressions and said ribs defining a fracture separation plane; and penetratively embrittling at least a portion of each of said ribs to define an embrittled zone which is more brittle than a remaining non-embrittled portion of the ductile metal part which remains ductile.

20. A method according to claim 19, wherein said penetratively embrittling step promotes formation of starting cracks at said embrittled zone upon application of a separating force for the fracture separation of the part.

21. A method according to claim 19, wherein said ductile metal part is selected from the group consisting of a connecting rod and an engine bearing.

22. An apparatus for forming a frangible zone for fracture separation of a ductile metal part, comprising:

means for forming a plurality of depressions extending into the ductile metal part from a surface thereof such that ribs are defined between adjacent ones of said depressions, said depressions and said ribs defining a fracture separation plane, each of said ribs having an apex located proximate said surface of the ductile metal part; and means for penetratively embrittling at least a portion of each of said ribs to define an embrittled zone which is more brittle than a remaining non-embrittled portion of the ductile metal part which remains ductile.

23. An apparatus according to claim 22, wherein said means for forming comprises at least one laser unit.

24. An apparatus according to claim 23, wherein said means for forming comprises at least two laser units having self-crossing laser beams for simultaneous formation of diametrically opposed of said frangible zones in an opening defined by the part.

25. An apparatus according to claim 23, wherein said means for penetratively embrittling comprises at least one jet arranged to feed one of air and oxygen toward the depressions.

26. An apparatus according to claim 22, wherein said means for penetratively embrittling comprises at least one jet arranged to feed one of air and oxygen toward the depressions.

27. An apparatus according to claim 22, wherein said ductile metal part is selected from the group consisting of a connecting rod and an engine bearing.

* * * * *